(12) United States Patent
Maruyama et al.

(10) Patent No.: US 11,441,690 B2
(45) Date of Patent: Sep. 13, 2022

(54) VALVE DEVICE AND ASSEMBLY METHOD OF VALVE DEVICE

(71) Applicant: AISIN CORPORATION, Kariya (JP)

(72) Inventors: Koichi Maruyama, Kariya (JP); Masafumi Yoshida, Kariya (JP); Naoki Emori, Kariya (JP); Naoto Yumisashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 31 days.

(21) Appl. No.: 17/171,767

(22) Filed: Feb. 9, 2021

(65) Prior Publication Data

US 2021/0246990 A1 Aug. 12, 2021

(30) Foreign Application Priority Data

Feb. 12, 2020 (JP) .............................. JP2020-021440

(51) Int. Cl.
*F16K 11/07* (2006.01)
*F16K 11/076* (2006.01)
*F16K 11/085* (2006.01)

(52) U.S. Cl.
CPC ........... *F16K 11/076* (2013.01); *F16K 11/085* (2013.01)

(58) Field of Classification Search
CPC .............................. F16K 11/076; F16K 11/085
See application file for complete search history.

(56) References Cited

U.S. PATENT DOCUMENTS

| | | | | | |
|---|---|---|---|---|---|
| 5,617,815 A | * | 4/1997 | Spies | .................... | F16K 11/076 123/41.1 |
| 5,687,764 A | * | 11/1997 | Tanaka | ................ | F16K 11/0525 137/625.43 |
| 6,539,899 B1 | * | 4/2003 | Piccirilli | ................. | F01P 7/167 123/41.1 |
| 6,688,333 B2 | * | 2/2004 | McLane | .............. | F16K 11/0856 123/41.1 |
| 7,506,664 B2 | * | 3/2009 | Norris | ................. | F16K 11/0876 137/625.42 |

(Continued)

FOREIGN PATENT DOCUMENTS

JP 2018536128 A 12/2018
JP 2020051547 A 4/2020

*Primary Examiner* — Kevin R Barss
(74) *Attorney, Agent, or Firm* — Buchanan Ingersoll & Rooney PC

(57) ABSTRACT

A valve device includes: a housing having a cylindrical internal peripheral wall; a fluid introduction path communicating with a space in the internal peripheral wall; a fluid discharge path communicating with the space in the internal peripheral wall; a valve element having a communication path bringing the fluid introduction and fluid discharge paths into communication with each other, and having a major radial portion formed with a predetermined first internal radius associated with an internal radius of the internal peripheral wall of the housing, a minor radial portion formed with a second internal radius, and an intermediate portion formed to join the major and minor radial portions together; a valve element rotation mechanism rotating the valve element inside the space; a seal member being able to contact the valve element rotating inside the space; and a shaft inserted in the space through a through-hole formed in the housing.

6 Claims, 8 Drawing Sheets

(56) References Cited

U.S. PATENT DOCUMENTS

| | | | |
|---|---|---|---|
| 7,984,730 B2 * | 7/2011 | Ziv | F16K 27/065 |
| | | | 137/239 |
| 2002/0005221 A1 * | 1/2002 | Sisk | F16K 11/0853 |
| | | | 137/625.43 |
| 2007/0267588 A1 * | 11/2007 | McLane | F16K 5/0464 |
| | | | 251/175 |
| 2017/0152957 A1 * | 6/2017 | Roche | B60H 1/04 |
| 2020/0103039 A1 | 4/2020 | Kashiwagi et al. | |

* cited by examiner

VALVE DEVICE AND ASSEMBLY METHOD OF VALVE DEVICE

CROSS REFERENCE TO RELATED APPLICATIONS

This application is based on and claims priority under 35 U.S.C. § 119 to Japanese Patent Application 2020-021440, filed on Feb. 12, 2020, the entire content of which is incorporated herein by reference.

TECHNICAL FIELD

This disclosure generally relates to a valve device that is able to control circulation of fluid, and an assembly method of the valve device.

BACKGROUND DISCUSSION

Heretofore, fluid has been utilized in various devices. Various kinds of valves are provided in a device in order to control circulation of such fluid. A valve of this kind is described in, for example, JP2018-536128A (Reference 1).

Reference 1 discloses a multi-port multi-mode valve with a plurality of operation modes. This multi-port multi-mode valve includes at least a first port, a second port, a third port, a fourth port, and a fifth port, and is configured in such a way that one of the first and second ports can be brought into communication with the third port when the fourth and fifth ports are brought into a communication state. The multi-port multi-mode valve is provided, inside a housing, with a stem shell that is rotatable by an actuator, and a port seal is utilized in order to seal a part between the stem shell and the port described above.

When sealing by use of such a port seal as in the technique described in Reference 1, sealing performance is secured by pushing the port seal against a stem shell. While such a port seal is combined by pressing the port seal against a housing, a configuration that divides the housing and the port may be employed in order to facilitate pressing, for example. In this case, a gasket, a fastening and fixing member (fastening screw), and the like are used, which increases the number of components, and leads to a cost increase.

A need thus exists for a valve device and an assembly method of the valve device which are not susceptible to the drawback mentioned above.

SUMMARY

A valve device according to this disclosure includes a housing, a fluid introduction path, a fluid discharge path, a valve element, a valve element rotation mechanism, a seal member, and a shaft. The housing has a cylindrical internal peripheral wall in which a columnar space is formed. The fluid introduction path is formed in the housing and communicates with the space in the internal peripheral wall. The fluid discharge path is formed in the housing and communicates with the space in the internal peripheral wall. The valve element has therein a communication path that brings the fluid introduction path and the fluid discharge path into communication with each other, and has, when seen along an axis center of the space in a state of being stored in the space, a major radial portion formed with a predetermined first internal radius associated with an internal radius of the internal peripheral wall of the housing, a minor radial portion formed with a second internal radius smaller than the first internal radius, and an intermediate portion that has an internal radius equal to or less than the first internal radius and equal to or more than the second internal radius and that is formed in such a way as to join the major radial portion and the minor radial portion together. The valve element rotation mechanism has the axis center as a rotation axis center and rotates the valve element inside the space. The seal member is provided on the internal peripheral wall and is able to contact the valve element rotating inside the space. The shaft is inserted in the space through a through-hole formed in the housing in such a way that the axis center of the valve element being stored in the space in a state of being out of alignment with the rotation axis center is aligned with the rotation axis center in accordance with the seal member and an internal radius of the valve element.

An assembly method of a valve device according to this disclosure includes a valve element mounting step, a seal member fitting step, a fastening and fixing step, and an insertion step. The valve element mounting step is mounting a valve element in a columnar space formed inside a base housing, the valve element including, in a plan view, a major radial portion formed with a predetermined first internal radius associated with an internal radius of an internal peripheral wall of the base housing, a minor radial portion formed with a second internal radius smaller than the first internal radius, and an intermediate portion that has an internal radius equal to or less than the first internal radius and equal to or more than the second internal radius and that is formed in such a way as to join the major radial portion and the minor radial portion together. The seal member fitting step is fitting a seal member between an internal peripheral wall of the space and the valve element in a state where an axis center of the space and an axis center of the valve element are not aligned with each other. The fastening and fixing step is fastening and fixing a lid housing that closes an opening part of the base housing, to the base housing by use of a fastening member. The insertion step is inserting a shaft into a valve-element-side through-hole provided along the axis center of the valve element in such a way that an axis center of the valve element and an axis center of the space are aligned with each other, while being guided by a guide portion that passes through a through-hole formed in the lid housing and that gradually decreases in internal diameter as the guide portion becomes apart from the through-hole provided on the through-hole side of the valve element.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A valve device according to this disclosure is configured to be able to switch a circulation state of fluid. A valve device 1 according to the present embodiment is described below.

Figure 1:
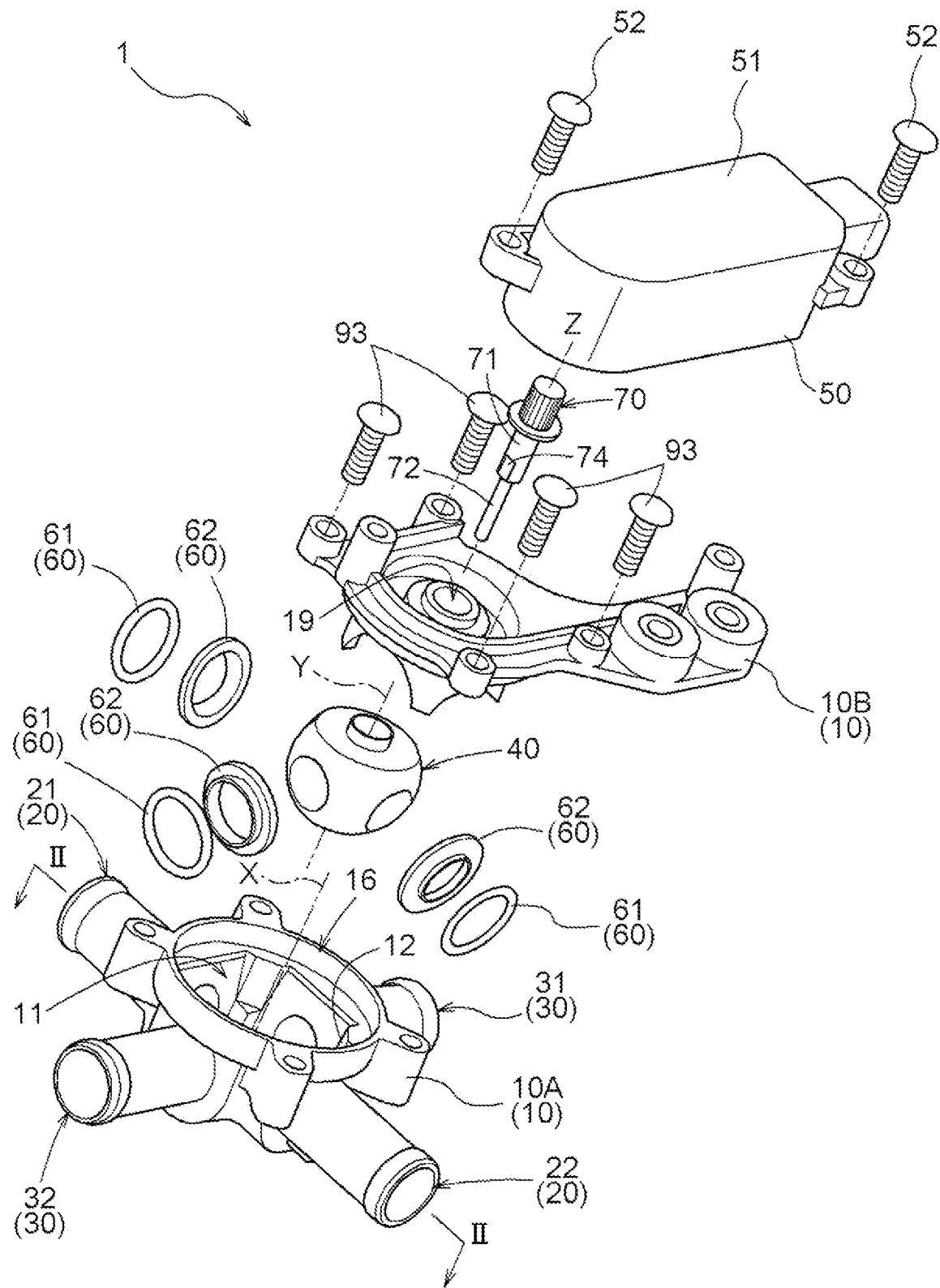
FIG. 1 is an exploded perspective view of a valve device.
Figure 2:
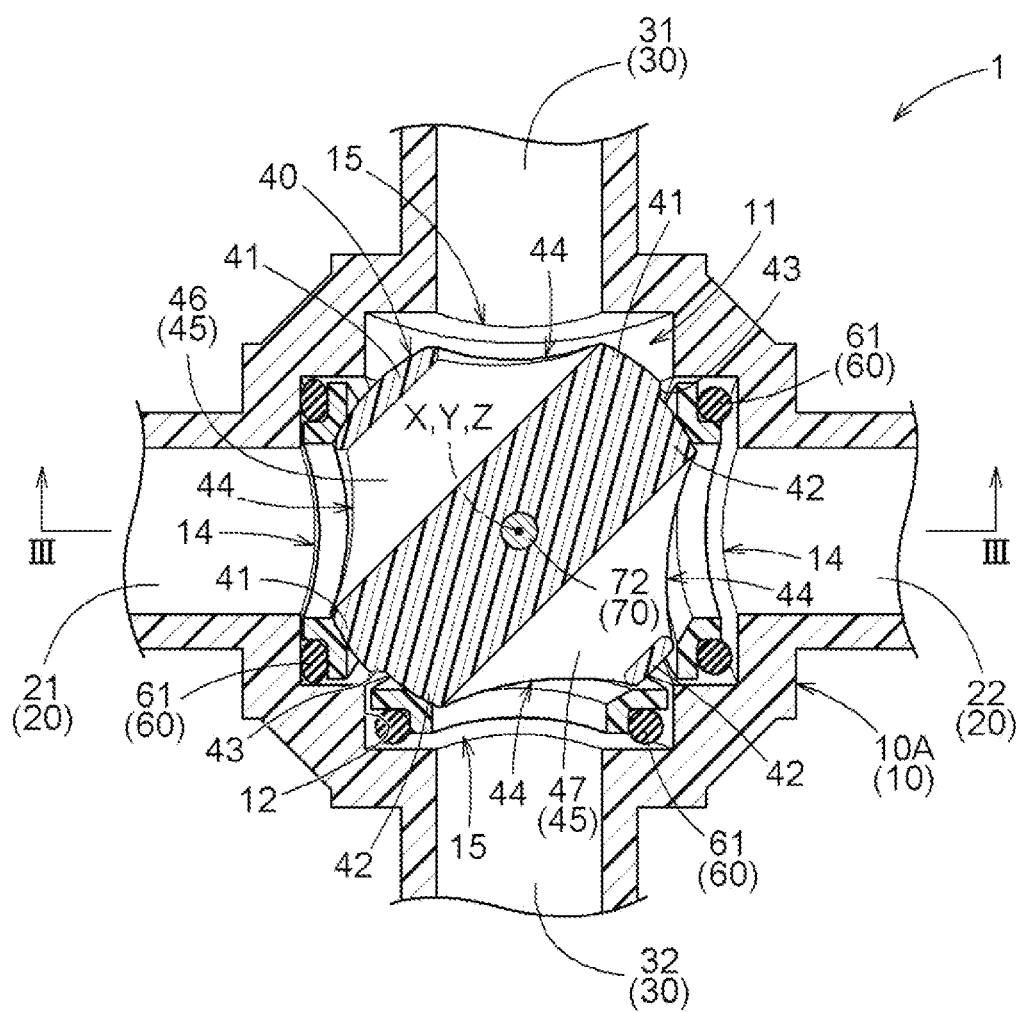
FIG. 2 is a sectional view taken along the line II-II of the valve device in FIG. 1.
Figure 3:
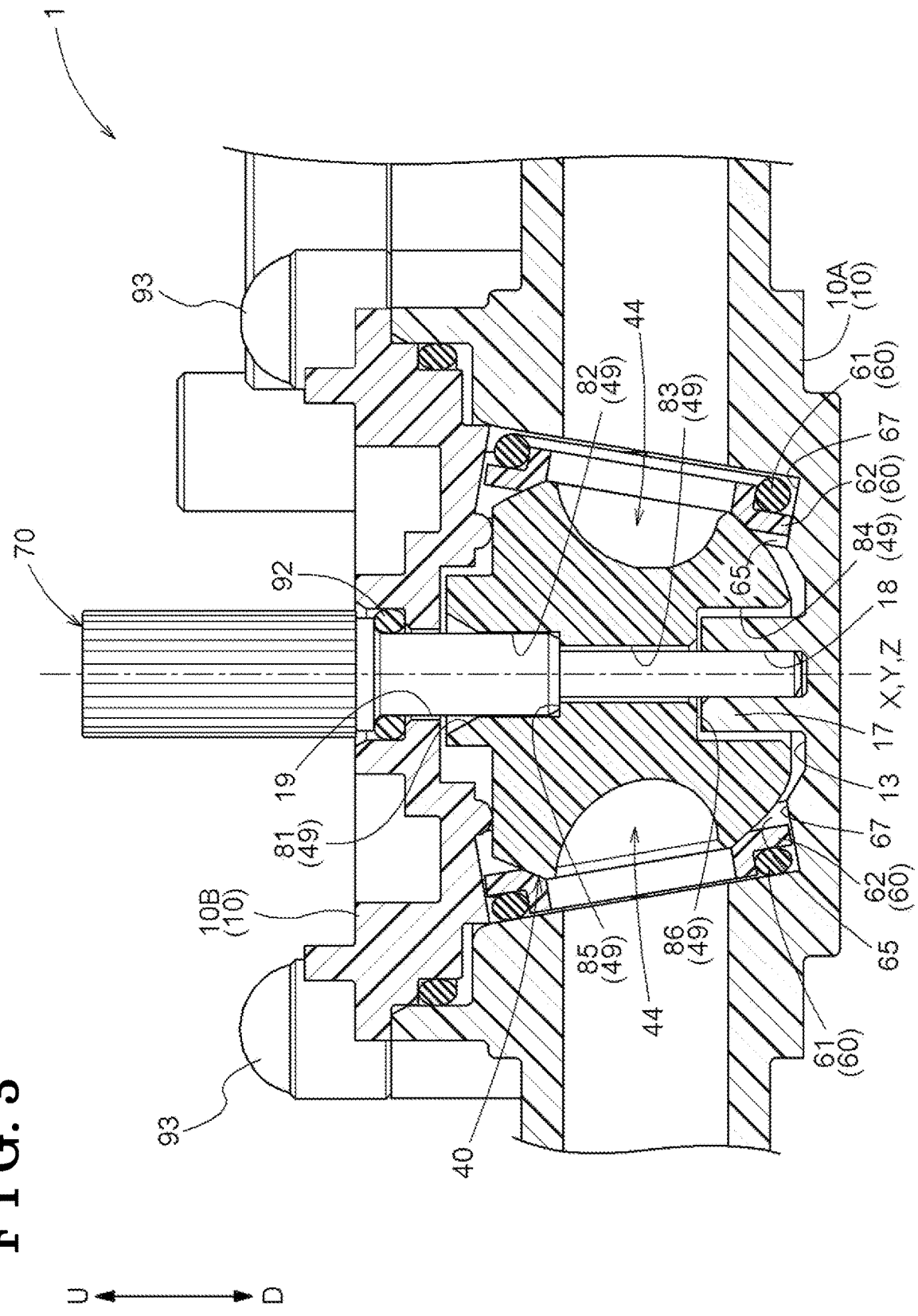
FIG. 3 is a sectional view taken along the line III-Ill of the valve device in FIG. 2.

FIG. 1 is a development view of the valve device 1. FIG. 2 illustrates a sectional view taken along the line II-II of the valve device in FIG. 1 after assembly of the valve device 1. FIG. 3 illustrates a sectional view taken along the line III-Ill of the valve device 1 in FIG. 2. As illustrated in FIGS. 1 to 3, the valve device 1 is constituted by including a housing 10, a fluid introduction path 20, a fluid discharge path 30, a valve element 40, a valve element rotation mechanism 50, a seal member 60, and a shaft 70.

Here, for ease of understanding, the present embodiment assumes that "upper" means a direction of an arrow U along a vertical direction of the valve device 1 in a state illustrated in FIG. 3, and "lower" means a direction of an arrow D along the vertical direction of the valve device 1 in a state illustrated in FIG. 3, unless otherwise noted.

The housing 10 has a cylindrical internal peripheral wall 12 in which a columnar space 11 is formed. In the present embodiment, the housing 10 is constituted of a base housing 10A and a lid housing 10B, and is made of a resin. Thus, the columnar space 11 by the internal peripheral wall 12 is formed in the base housing 10A. Although an opening part 14 and an opening part 15 are provided in the internal peripheral wall 12 of the base housing 10A, the space 11 by parts other than the opening part 14 and the opening part 15 is formed with an equal internal diameter around an axis center X of the space 11 in the present embodiment. The space 11 is surrounded by such an internal peripheral wall 12 and a bottom surface 13. Therefore, the space 11 is configured by being surrounded by a bowl-shaped wall. The base housing 10A is open in a part facing the bottom surface 13, and the lid housing 10B is provided in such a way as to close the opening part (an opening part 16). A through-hole 19 through which the later-described shaft 70 is passed is formed in the lid housing 10B.

The fluid introduction path 20 is formed integrally with the housing 10, and communicates with the columnar space 11 in the opening part 14 of the internal peripheral wall 12. The fluid introduction path 20 serves as an introduction path to the valve device 1, for fluid of which flow volume is controlled by the valve device 1. In the present embodiment, the opening part 14 is provided in the internal peripheral wall 12 of the base housing 10A, and the fluid introduction path 20 communicates with the space 11 via the opening part 14. In the present embodiment, two fluid introduction paths 20 are provided in the base housing 10A. Note that when the two fluid introduction paths 20 are described below as a first fluid introduction path 21 and a second fluid introduction path 22 when distinguished from each other.

The fluid discharge path 30 is formed integrally with the housing 10, and communicates with the columnar space 11 in the opening part 15 of the internal peripheral wall 12. The fluid discharge path 30 serves as a discharge path from the valve device 1, for fluid of which flow volume is controlled by the valve device 1. In the present embodiment, the opening part 15 different from the opening part 14 described above is provided in the internal peripheral wall 12 of the base housing 10A, and the fluid discharge path 30 communicates with the space 11 via the opening part 15. In the present embodiment, two fluid discharge paths 30 are provided in the base housing 10A. Note that when the two fluid discharge paths 30 are described below as a first fluid discharge path 31 and a second fluid discharge path 32 when distinguished from each other.

Here, although not particularly limited, the opening part 14 and the opening part 15 are each formed into a circular shape having the same internal diameter in the present embodiment.

Although the valve element 40 is configured by a shape in which an upper side and a lower side of a sphere are cut in surfaces orthogonal to an axis center Y of the valve element 40 in the present embodiment as illustrated in FIGS. 1 and 3, the valve element 40 can also be configured without being particularly cut. Moreover, in the present embodiment, the valve element 40 is formed by use of a resin similarly to the housing 10, and is stored in the columnar space 11 of the housing 10 described above.

As illustrated in FIG. 2, the valve element 40 is configured in a plan view (a view in a direction along the axis center Y) not with a circular arc having a single internal radius (not with a true circle), but with a curve and a straight line having a plurality of internal radii. Specifically, the valve element 40 has a major radial portion 41, a minor radial portion 42, and an intermediate portion 43.

The major radial portion 41 is formed with a predetermined first internal radius associated with an internal radius of the internal peripheral wall 12 of the housing 10 when seen along the axis center X of the space 11 in a state where the valve element 40 is stored in the space 11. "When seen along the axis center X of the space 11 in a state where the valve element 40 is stored in the space 11" refers to a plan view of the valve element 40 in a state of being stored in the space 11. As described above, parts of the internal peripheral wall 12 of the housing 10 other than the opening part 14 and the opening part 15 are constituted of a uniform internal diameter around the axis center X. The major radial portion 41 is formed with the first internal radius that is an internal radius smaller than the internal radius of the internal peripheral wall 12 so as not to contact the internal peripheral wall 12 when the valve element 40 is rotated with the axis center X as a rotation axis. Although details will be described later, the valve element 40 is rotated with the axis center X as a rotation axis center during an actuation of the valve device 1. Although not particularly limited, a difference between the internal radius of the internal peripheral wall 12 and the first internal radius may be such that at least a clearance is formed so that the valve element 40 does not contact the internal peripheral wall 12 when rotated with the axis center X as a rotation axis center (so that slide resistance is not generated).

In the present embodiment, as illustrated in FIG. 2, the major radial portion 41 is provided in a range of 180 degrees in a plan view of the valve element 40. In the present embodiment, the major radial portion 41 is formed so as to include one of later-described two communication paths 45 provided inside the valve element 40, in a plan view of the valve element 40. Thus, the major radial portion 41 is provided separately in three parts. Therefore, a peripheral position of the major radial portion 41 is set in accordance with a position of the communication path 45.

The minor radial portion 42 is formed with a second internal radius smaller than the first internal radius. The first internal radius is an internal radius of the major radial portion 41. Therefore, the minor radial portion 42 is configured to have an internal radius smaller than the major radial portion 41, as illustrated in FIG. 2. As described above, a clearance is formed between the major radial portion 41 and the internal peripheral wall 12 so that the valve element 40 does not contact the internal peripheral wall 12 when rotated with the axis center X as a rotation axis center. A clearance having a diametrical length longer than the clearance between the major radial portion 41 and the internal peripheral wall 12 is formed between the minor radial portion 42 and the internal peripheral wall 12.

In the present embodiment, as illustrated in FIG. 2, the minor radial portion 42 is provided in such a way that the later-described intermediate portion 43 and the minor radial portion 42 are in a range of 180 degrees in a plan view of the valve element 40. In the present embodiment, the minor radial portion 42 is formed so as to include the other one of the two communication paths 45 provided inside the later-described valve element 40, in a plan view of the valve element 40. Thus, the minor radial portion 42 is provided separately in three parts. Therefore, a peripheral position of the minor radial portion 42 is set in accordance with a position of the communication path 45.

The intermediate portion 43 is formed with an internal radius equal to or less than the first internal radius and equal to or more than the second internal radius, in such a way as to join the major radial portion 41 and the minor radial portion 42 together. "An internal radius equal to or less than the first internal radius and equal to or more than the second internal radius" signifies that an internal radius of the intermediate portion 43 is formed with an internal radius between the first internal radius of the major radial portion 41 and the second internal radius of the minor radial portion 42. Here, an internal radius between the first internal radius of the major radial portion 41 and the second internal radius of the minor radial portion 42 is not a single internal radius, but an internal radius that changes in length in a range of the first internal radius of the major radial portion 41 and the second internal radius of the minor radial portion 42. The intermediate portion 43 may be formed with an arc shape that is smooth in a plan view. In other words, the intermediate portion 43 may be configured in such a way that the internal radius thereof is smoothly changed by degrees. The intermediate portion 43 may be formed to have an acute-angled part that is acute-angled in a plan view.

"Formed to join the major radial portion 41 and the minor radial portion 42 together" means being provided across the major radial portion 41 and the minor radial portion 42 in a plan view of the valve element 40. In the present embodiment, as illustrated in FIG. 2, there are two places where the major radial portion 41 and the minor radial portion 42 come in proximity to each other. Therefore, the intermediate portions 43 are provided at two places in such a way as to join the major radial portion 41 and the minor radial portion 42 together.

In the present embodiment, the minor radial portion 42 and the intermediate portion 43 are configured with a range of 180 degrees which an external edge portion of the minor radial portion 42 and an external edge portion of the intermediate portion 43 account for relative to an external edge portion of the valve element 40 when the valve element 40 is seen along the axis center Y of the valve element 40. Therefore, the minor radial portion 42 and the intermediate portion 43 are configured in such a way that when the valve element 40 is seen along the axis center Y of the valve element 40, an angle which an external edge portion of the major radial portion 41 accounts for relative to the axis center Y and an angle which the external edge portion of the minor radial portion 42 and the external edge portion of the intermediate portion 43 account for relative to the axis center Y are equal to each other.

The valve element 40 has therein the communication path 45 that brings the fluid introduction path 20 and the fluid discharge path 30 into communication with each other. In the present embodiment, as illustrated in FIG. 2, opening parts 44 that are open in the major radial portion 41 are provided at two places along a peripheral direction of the valve element 40. As illustrated in FIG. 3, the opening parts 44 are provided in a side surface of the valve element 40 in a state of being stored in the space 11. The communication path 45 is provided in such a way as to communicate with the two opening parts 44.

In the present embodiment, the opening parts 44 are provided at two places along a peripheral direction of the valve element 40 in the minor radial portion 42 as well. The opening parts 44 are also provided on a side surface of the valve element 40 in a state of being stored in the space 11. The communication path 45 is provided in such a way as to communicate with the two opening parts 44. Therefore, the two communication paths 45 are provided in the valve element 40. Note that when the two communication paths 45 are distinguished from each other, the communication path 45 provided in the major radial portion 41 is described below as a first communication path 46, and the communication path 45 provided in the minor radial portion 42 is described below as a second communication path 47.

The first communication path 46 and the second communication path 47 each pass through the valve element 40 along a diametrical direction. The first communication path 46 and the second communication path 47 are not in communication with each other. In the present embodiment, the valve element 40 is configured to be switchable, by controlling rotation of the valve element 40, to a first communication state (a state in FIG. 2) that brings the first fluid introduction path 21 and the first fluid discharge path 31 into communication with each other via the first communication path 46 and brings the second fluid introduction path 22 and the second fluid discharge path 32 into communication with each other via the second communication path 47, and a second communication state (a state in FIG. 6) that brings the first fluid introduction path 21 and the second fluid discharge path 32 into communication with each other via the first communication path 46 and brings the second fluid introduction path 22 and the first fluid discharge path 31 into communication with each other via the second communication path 47. Naturally, the valve element 40 is also configurable to be switchable to other states.

Note that in the first communication state in FIG. 2, only the seal member 60 (a later-described first seal portion 61) provided in the first fluid introduction path 21 among three seal members 60 is pressed by the major radial portion 41 of the valve element 40 and collapsed, but the seal members 60 (first seal portions 61) provided in the second fluid introduction path 22 and the first fluid discharge path 31 face the minor radial portion 42 of the valve element 40 and are therefore not collapsed. Thus, when fluid is circulated between the first fluid introduction path 21 and the first fluid discharge path 31 via the first communication path 46 in the first communication state, the fluid leaks out to the second fluid introduction path 22 and the first fluid discharge path 31 from the seal member 60 provided in the second fluid introduction path 22, and circulating fluid in the first communication state is not preferable. Positions of the major radial portion 41 and the minor radial portion 42 of the valve element 40 in the first communication state are positions effective during assembly of the valve device 1 described later.

However, when the valve element 40 is rotated 180 degrees from the first communication state with the axis center Y as a rotation axis, the seal member 60 (the later-described first seal portion 61) provided in the second fluid introduction path 22 and the seal member 60 (the later-described first seal portion 61) provided in the second fluid discharge path 32 among the three seal members 60 can be pressed by the major radial portion 41 of the valve element 40 and collapsed. In this state, fluid can be circulated between the first fluid introduction path 21 and the first fluid discharge path 31 via the second communication path 47, and at the same time, fluid can be circulated between the second fluid introduction path 22 and the second fluid discharge path 32 via the first communication path 46.

Figure 6:
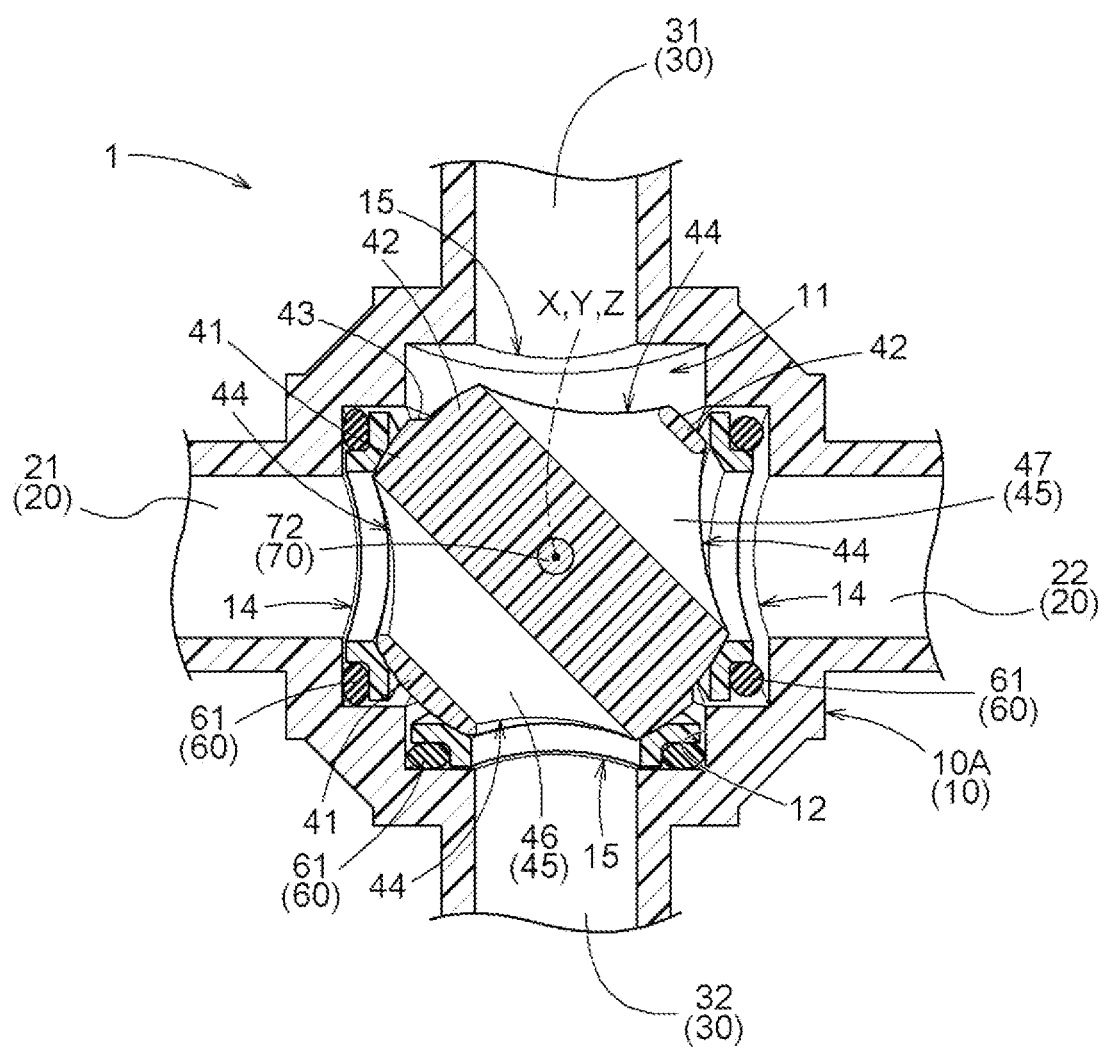
FIG. 6 is a view illustrating a state of the seal member when a valve element is rotated.

In the second communication state in FIG. 6, the seal member 60 (the later-described first seal portion 61) provided in the first fluid introduction path 21 and the seal member 60 (the later-described first seal portion 61) provided in the second fluid discharge path 32 among the three seal members 60 are pressed by the major radial portion 41 of the valve element 40 and collapsed. Thus, In the second communication state, fluid can be circulated between the first fluid introduction path 21 and the second fluid discharge path 32 via the first communication path 46, and at the same time, fluid can be circulated between the second fluid introduction path 22 and the first fluid discharge path 31 via the second communication path 47.

As illustrated in FIG. 3, the valve element 40 is provided with a valve-element-side through-hole 49 coaxially with the axis center Y of the valve element 40. In the present embodiment, the valve-element-side through-hole 49 includes a guide portion 81, a first internal diameter portion 82, a second internal diameter portion 83, and a third internal diameter portion 84.

The guide portion 81 is formed on a side where the through-hole 19 is formed in a state where the valve element 40 is stored in the space 11, in such a way as to gradually decrease in internal diameter as the guide portion 81 becomes apart from the through-hole 19, and the guide portion 81 guides entry of the shaft 70. The side where the through-hole 19 is formed in a state where the valve element 40 is stored in the space 11 is the lid housing 10B side in a state where the valve element 40 is stored in the space 11. Thus, the guide portion 81 is formed in such a way that an internal diameter thereof on the lid housing 10B side is wider than an internal diameter on a side where the guide portion 81 is apart from the lid housing 10B, and the guide portion 81 is formed into a tapered shape in a section illustrated in FIG. 3. This enables entry of the shaft 70 inserted from the lid housing 10B side to be guided.

The first internal diameter portion 82 communicates with the guide portion 81, and is formed with a predetermined first internal diameter. In other words, the first internal diameter portion 82 is provided continuously with an end portion of the guide portion 81 on a side being apart from the lid housing 10B. In the present embodiment, the first internal diameter that is an internal diameter of the first internal diameter portion 82 is provided at the same internal diameter as that of the end portion of the guide portion 81 on a side being apart from the lid housing 10B.

The second internal diameter portion 83 communicates with the first internal diameter portion 82, and is formed with a second internal diameter smaller than the first internal diameter. In other words, the second internal diameter portion 83 is provided continuously with an end portion of the second internal diameter portion 83 on a side being apart from the guide portion 81. Further, the second internal diameter that is an internal diameter of the second internal diameter portion 83 is provided at an internal diameter smaller than the first internal diameter of the first internal diameter portion 82. In the present embodiment, as illustrated in FIG. 3, the first internal diameter portion 82 and the second internal diameter portion 83 are connected by a cross surface 85 where internal peripheral surfaces of the first internal diameter portion 82 and the second internal diameter portion 83 cross an axis center direction of the valve element 40.

The third internal diameter portion 84 communicates with the second internal diameter portion 83, and is formed with a third internal diameter. Here, a protruding portion 17 protruding toward the opening part 16 side is formed on the bottom surface 13 of the housing 10. The third internal diameter is set in such a way that the protruding portion 17 is stored in a state of being apart from an internal peripheral surface of the third internal diameter portion 84 when the valve element 40 is stored in the space 11. In other words, the protruding portion 17 is covered in a state of having a clearance relative to the internal peripheral surface of the third internal diameter portion 84. In the present embodiment, as illustrated in FIG. 3, the second internal diameter portion 83 and the third internal diameter portion 84 are connected by a cross surface 86 where the internal peripheral surfaces of the second internal diameter portion 83 and the third internal diameter portion 84 cross the axis center direction of the valve element 40.

An upper side of the space 11 is liquid-tightly closed by the lid housing 10B through which the shaft 70 passes. In the present embodiment, a distal side of the shaft 70 is inserted into a hole portion 18 provided in a diametrically central portion of the protruding portion 17, and a proximal side is supported by the lid housing 10B via a seal member 92. The lid housing 10B is fastened and fixed to the base housing 10A by a fastening member 93.

The valve element rotation mechanism 50 rotates the valve element 40 inside the columnar space 11 via the shaft 70 with the axis center X as a rotation axis center Z. The valve element rotation mechanism 50 is configured to have a motor, and rotates the shaft 70 in accordance with an instruction from a high-order system. In accordance with this instruction, the valve element 40 is rotated, and switched to the first communication state and second communication state described above.

The seal member 60 is provided on the internal peripheral wall 12, and provided contactably with the valve element 40 that is rotated inside the space 11. In the present embodiment, the seal member 60 is constituted of the first seal portion (e.g., an O-ring) 61 formed by use of a resilient member, and a second seal portion (e.g., a resin ring) 62 formed by use of a resin. As illustrated in FIG. 3, the seal member 60 is provided between the internal peripheral wall 12 and the valve element 40 in such a way that the first seal portion 61 is combined with the second seal portion 62 and that the second seal portion 62 is positioned on the axis center X side of the space 11. Therefore, the valve element 40 is rotated in such a way as to slide relative to the second seal portion 62. In the present embodiment, as illustrated in FIG. 2, the seal members 60 are provided in the opening part 14 of the first fluid introduction path 21, the opening part 14 of the second fluid introduction path 22, and the opening part 15 of the second fluid discharge path 32, and no seal member 60 is provided the opening part 15 of the first fluid discharge path 31.

In the present embodiment, in a case where the seal member 60 is seen along a direction parallel to both a diametrical direction of the space 11 and a diametrical direction of the seal member 60, the seal member 60 is provided in a state of being tilted relative to the axis center X of the space 11. The case where the seal member 60 is seen along the direction parallel to both the diametrical direction of the space 11 and the diametrical direction of the seal member 60 is not a case where the seal member 60 is seen along an axial direction of the seal member 60, but a case where the seal member 60 is seen from a direction orthogonal to the axial direction of the seal member 60, for example, as illustrated in FIG. 3. In this case, as illustrated in FIG. 3, the seal member 60 is provided in a state where an axial end face of the seal member 60 and the axis center X are not parallel to each other. In the present embodiment, a distance between the axis center X and the seal member 60 is provided in such a way as to be greater on a side closer to the lid housing 10B, and shorter on a side closer to the bottom surface 13. For example, a tilt of the space 11 relative to the axis center X is suitably about 10 degrees. Naturally, the tilt can be set to about 5 degrees to 20 degrees, or can be set to about 10 degrees to 15 degrees.

Figure 4:
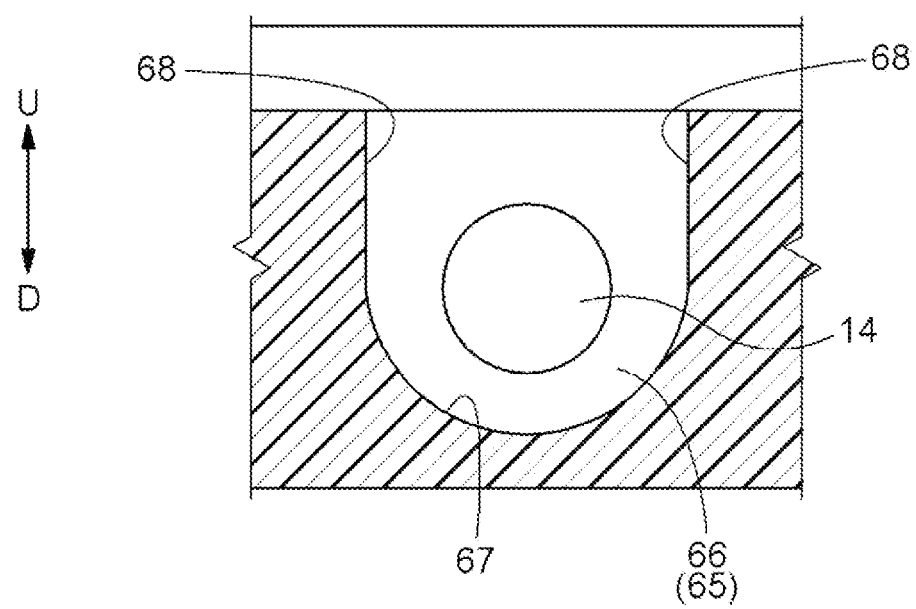
FIG. 4 is a view illustrating an attachment surface for a seal member in a housing.

In the present embodiment, a seal member holding mechanism 65 as illustrated in FIG. 4 is provided in a part of the internal peripheral wall 12 where the seal member 60 is provided, in such a way that the seal member 60 can be disposed at an appropriate position. The seal member holding mechanism 65 has a receiving surface 66 that maintains the seal member 60 in a state of being tilted relative to the axis center X of the space 11 as described above, and the bottom surface 13 side of the receiving surface 66 is formed into a circular-arc-shaped portion 67 as illustrated in FIG. 4. The circular-arc-shaped portion 67 is semicircularly shaped in a front view, and a straight-line-shaped portion 68 is formed on an upper side of the circular-arc-shaped portion 67. The circular-arc-shaped portion 67 and the straight-line-shaped portion 68 each have a predetermined length (a depth in a direction toward a far side of the sheet in FIG. 4) relative to the receiving surface 66. In other words, the receiving surface 66 is configured in a state of being depressed relative to the internal peripheral wall 12, and the circular-arc-shaped portion 67 and the straight-line-shaped portion 68 are each formed with the above-described predetermined length ranging from the internal peripheral wall 12 to the receiving surface 66. It is preferred that the predetermined length be set in accordance with an axial length of the seal member 60. Here, an internal radius center of the circular-arc-shaped portion 67 is preferably aligned with an axis center of each of the opening parts 14 and 15. This enables the seal member 60 to be easily disposed coaxially with the opening parts 14 and 15. Therefore, combining performance can be improved. Note that although only the opening part 14 is illustrated in FIG. 4, the seal member holding mechanism 65 is also provided in the opening part 15 where the seal member 60 is provided.

The shaft 70 is inserted into the space 11 through the through-hole 19 formed in the housing 10, in such a way that the axis center Y of the valve element 40 stored in the space 11 in a state of being out of alignment with the rotation axis center Z is aligned with the rotation axis center Z in accordance with the seal member 60 and an internal radius of the valve element 40. Here, as described above, the valve element 40 has the major radial portion 41 formed with the first internal radius and the minor radial portion 42 formed with the second internal radius. Thus, the internal radius of the valve element 40 is not uniform. Since the seal member 60 is provided between such a valve element 40 and the internal peripheral wall 12, the axis center X of the space 11 and the axis center Y of the valve element 40 are in a state of being not being aligned with each other before the valve element 40 is mounted in the space 11 of the base housing 10A and the shaft 70 is inserted. Accordingly, the shaft 70 is inserted into the valve-element-side through-hole 49 provided in the valve element 40 via the through-hole 19 provided in the lid housing 10B in such a way that the axis center X and the axis center Y are aligned with the rotation axis center Z by the valve element rotation mechanism 50. This enables the axis center X of the space 11 and the axis center Y of the valve element 40 to be aligned with the rotation axis center Z.

Figure 5:
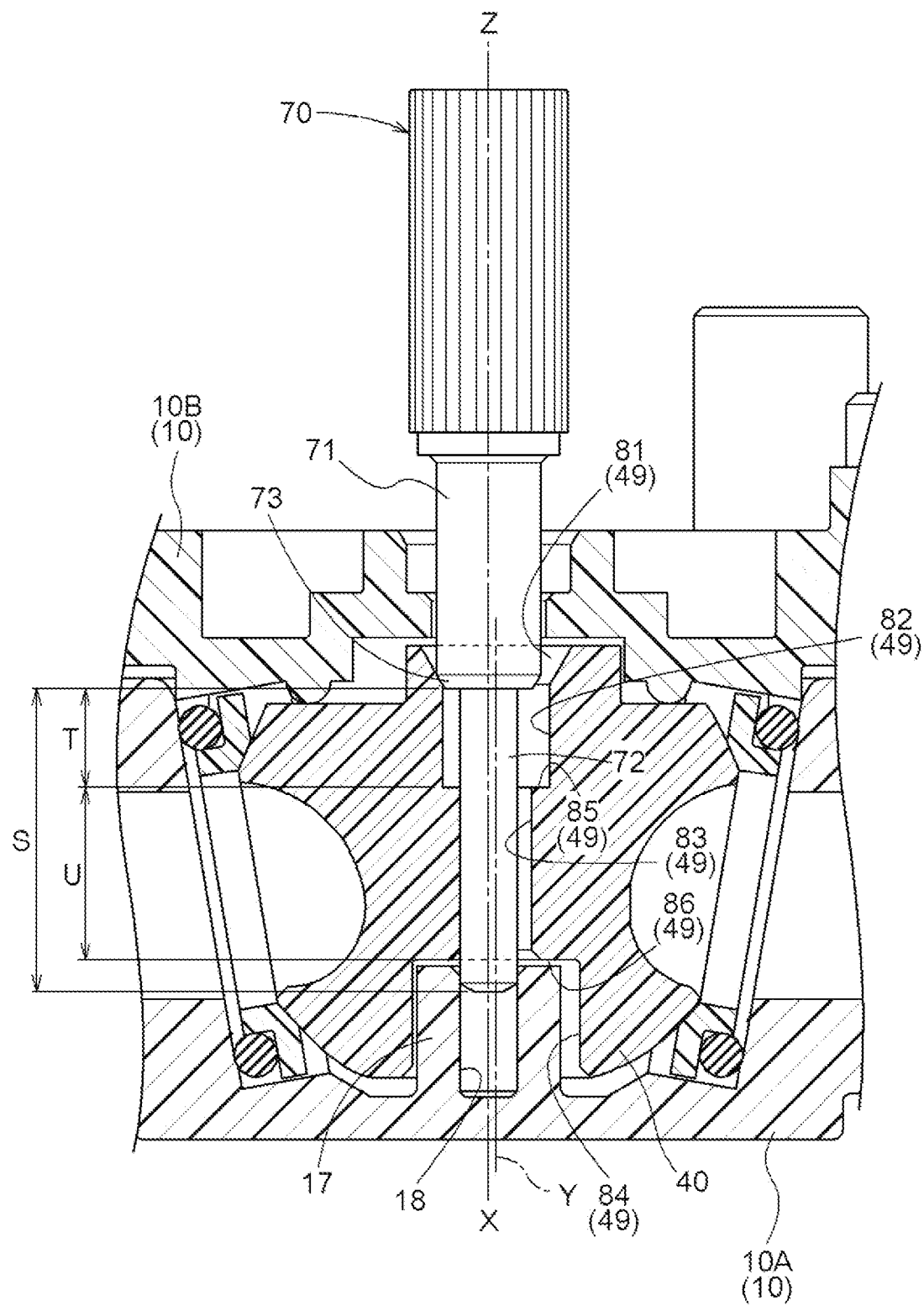
FIG. 5 is a view illustrating a state where a shaft is in a process of being inserted.

FIG. 5 is a sectional side view illustrating a state where the shaft 70 is in a process of being inserted into the housing 10. In the present embodiment, the shaft 70 includes a first external diameter portion 71, a second external diameter portion 72, and a connection portion 73. The first external diameter portion 71 is formed with a first external diameter associated with the first internal diameter of the first internal diameter portion 82. The first external diameter associated with the first internal diameter is an external diameter that enables at least the first external diameter portion 71 to pass through the first internal diameter portion 82. Specifically, the external diameter of the first external diameter portion 71 is preferably an external diameter that produces "loose fit" where a slight clearance is formed between the first external diameter portion 71 and the first internal diameter portion 82 in a state where the first external diameter portion 71 passes through and is inserted into the first internal diameter portion 82.

The second external diameter portion 72 is formed with a second external diameter associated with the second internal diameter of the second internal diameter portion 83. The second external diameter associated with the second internal diameter is an external diameter that enables the second external diameter portion 72 to pass through the second internal diameter portion 83. Although the axis center Y of the valve element 40 and the axis center X of the space 11 are out of alignment with each other before the shaft 70 is inserted as described above, the second external diameter is preferably set to have a large clearance relative to the second internal diameter in such a way that the second external diameter portion 72 can pass through the second internal diameter portion 83 even in a state where the axis center X and the axis center Y are out of alignment with each other.

Note that it is preferable to provide a cutout portion 74 (see FIG. 1) in an external peripheral surface of the shaft 70 (an external peripheral surface of the first external diameter portion 71 in the present embodiment), and configure the cutout portion 74 to fit into an internal peripheral surface of the valve-element-side through-hole 49 of the valve element 40 (an internal peripheral surface of the first internal diameter portion 82 in the present embodiment), in such a way that the valve element 40 is rotated in accordance with rotation of the shaft 70. Thus, a receiving portion (not illustrated) that fits into the cutout portion 74 is preferably provided in the first internal diameter portion 82 of the valve element 40. Note that the cutout portion 74 is preferably provided in the external peripheral surface of the shaft 70 by cutting in such a way as to have a surface parallel to the rotation axis center Z of the shaft 70.

The connection portion 73 is provided between the first external diameter portion 71 and the second external diameter portion 72. An external diameter of the connection portion 73 is configured to gradually decrease as the external diameter of the connection portion 73 becomes closer to the second external diameter portion 72 side from the first external diameter portion 71 side. Specifically, an end portion of the connection portion 73 on the first external diameter portion 71 side is configured with an external diameter of the first external diameter portion 71, and an end portion of the connection portion 73 on the second external diameter portion 72 side is configured with an external diameter of the second external diameter portion 72. Particularly, the first external diameter portion 71 side of the connection portion 73 is formed into a tapered shape in a view of a direction orthogonal to the rotation axis center Z, as illustrated in FIG. 5. The shaft 70 enters while the part in a tapered shape contacts the guide portion 81, thereby enabling the axis center Y of the valve element 40 to be aligned with the axis center X of the space 11 and the rotation axis center Z of the shaft 70.

In the present embodiment, an axial length S of the second external diameter portion 72 is configured to be longer than a sum of an axial length T of the first internal diameter portion 82 and an axial length U of the second internal diameter portion 83. In other words, the axial length S of the second external diameter portion 72 is configured in such a way that Expression (1) below is satisfied.

$$S > T + U \quad (1)$$

Consequently, the second external diameter portion 72 is inserted into the hole portion 18 of the protruding portion 17 protruding from the bottom surface 13 before the first external diameter portion 71 enters the first internal diameter portion 82. Accordingly, first, a position of the shaft 70 is determined by the through-hole 19 of the lid housing 10B and the hole portion 18 in such a way that the rotation axis center Z of the shaft 70 is aligned with the axis center X. Further, along with entry of the shaft 70 into the valve-element-side through-hole 49, the connection portion 73 presses the guide portion 81 in a part in which the shaft 70 and the valve element 40 contact each other, thus causing the first external diameter portion 71 to enter the first internal diameter portion 82. This enables the axis center Y of the valve element 40 to be aligned with the rotation axis center Z (the axis center X).

At this point, it is preferred that in the valve element 40, a diameter reduction amount of the minor radial portion 42 relative to the major radial portion 41 be equal to or more than a collapse amount of the seal member 60 in a state where the major radial portion 41 is in contact with the seal member 60 while the axis center Y of the valve element 40 is aligned with the rotation axis center Z by the shaft 70. The diameter reduction amount of the minor radial portion 42 relative to the major radial portion 41 is a difference between the first internal radius of the major radial portion 41 and the second internal radius of the minor radial portion 42. As described above, the seal member 60 is collapsed when the axis center Y of the valve element 40 and the axis center X of the space 11 are aligned with each other. At this point, the first seal portion 61 of the seal member 60 is more collapsed than the second seal portion 62, an amount in which the first seal portion 61 is collapsed is equivalent to a "collapse amount", and the difference between the first internal radius of the major radial portion 41 and the second internal radius of the minor radial portion 42 is made equal to or more than the "collapse amount". This enables the first seal portion 61 to be certainly collapsed by the major radial portion 41, whereas the minor radial portion 42 does not press the seal member 60 (the first seal portion 61). Therefore, sealing performance of the major radial portion 41 by the seal member 60 can be enhanced, and wear of the seal member 60 in the minor radial portion 42 can be suppressed.

Next, an assembly method of the valve device 1 is described. First, the valve element 40 is mounted in the columnar space 11 formed inside the base housing 10A. At this point, the valve element 40 is preferably mounted in such a way that the protruding portion 17 is inserted into the third internal diameter portion 84 of the valve element 40. Moreover, the valve element 40 is preferably mounted at a position where the major radial portion 41 and the minor radial portion 42 are brought into the first communication state illustrated in FIG. 2. Consequently, in a subsequent step, three seal members 60 can be fitted with a minimum collapse amount of the first seal portion 61. This step is equivalent to a valve element mounting step related to the assembly method. Note that at this point, the axis center X of the space 11 and the axis center Y of the valve element 40 may not be aligned with each other.

Next, the seal member 60 is fitted between the internal peripheral wall 12 of the space 11 and the valve element 40. As described above, the valve element 40 is provided with the major radial portion 41 and the minor radial portion 42. In fitting the seal member 60, the first seal portion 61 is preferably combined with the second seal portion 62 in advance. In order to facilitate the fitting of the seal member 60, the valve element 40 is preferably moved inside the space 11 in such a way that the axis center X of the space 11 and the axis center Y of the valve element 40 are not aligned with each other at a position resulting in the first communication state. This step is equivalent to a seal member fitting step related to the assembly method.

Next, the lid housing 10B that closes an opening part of the base housing 10A is fastened and fixed to the base housing 10A by use of the fastening member 93. This step is equivalent to a fastening and fixing step related to the assembly method. Note that even in this state, the axis center X of the space 11 and the axis center Y of the valve element 40 may be in a state of not being aligned with each other.

Furthermore, the shaft 70 is inserted into the valve-element-side through-hole 49 provided along the axis center Y of the valve element 40 in such a way that the axis center Y of the valve element 40 and the axis center X of the space 11 are aligned with each other, while being guided by the guide portion 81 that passes through the through-hole 19 formed in the lid housing 10B and that gradually decreases in internal diameter as the guide portion 81 becomes apart from the through-hole 19 provided on the through-hole 19 side in the valve element 40. This enables the axis center Y of the valve element 40 and the axis center X of the space 11 to be aligned with each other, and further enables the axis center Y of the valve element 40 to be aligned with the rotation axis center Z of the shaft 70. This step is equivalent to an insertion step related to the assembly method.

Finally, a case 51 of the valve element rotation mechanism 50 is fastened and fixed to the lid housing 10B by use of a fastening member 52 in such a way that the shaft 70 is rotatable by the motor of the valve element rotation mechanism 50. This step is equivalent to a valve element rotation mechanism installation step related to the assembly method. The assembly method as above enables the valve device 1 to be assembled.

Other Embodiments

In the embodiment described above, the axial length S of the second external diameter portion 72 is configured to be longer than the sum of the axial length T of the first internal diameter portion 82 and the axial length U of the second internal diameter portion 83. However, the axial length S of the second external diameter portion 72 may be equal to or shorter than the sum of the axial length T of the first internal diameter portion 82 and the axial length U of the second internal diameter portion 83.

In the embodiment described above, a range which the external edge portion of the minor radial portion 42 and the external edge portion of the intermediate portion 43 account for relative to the external edge portion of the valve element 40 when the valve element 40 is seen along the axis center Y of the valve element 40 is 180 degrees. However, the range which the external edge portion of the minor radial portion 42 and the external edge portion of the intermediate portion 43 account for relative to the external edge portion of the valve element 40 may be larger or smaller than 180 degrees. When the range is larger than 180 degrees, the major radial portion 41 of the valve element 40 presses the first seal portion 61 of the seal member 60 provided in the second fluid introduction path 22, and leakage of fluid between the second fluid introduction path 22 and the first fluid discharge path 31 can be prevented, even in the first communication state illustrated in FIG. 2. Consequently, in the first communication state, fluid can be circulated between the first fluid introduction path 21 and the first fluid discharge path 31 via the first communication path 46, and at the same time, fluid can be circulated between the second fluid introduction path 22 and the second fluid discharge path 32 via the second communication path 47.

In the embodiment described above, a diameter reduction amount of the minor radial portion 42 relative to the major radial portion 41 is equal to or more than a collapse amount of the seal member 60 in a state where the major radial portion 41 is in contact with the seal member 60 while the axis center Y of the valve element 40 is aligned with the rotation axis center Z by the shaft 70. However, the diameter reduction amount of the minor radial portion 42 relative to the major radial portion 41 can also be smaller than a collapse amount of the seal member 60 in a state where the major radial portion 41 is in contact with the seal member 60 while the axis center Y of the valve element 40 is aligned with the rotation axis center Z by the shaft 70.

In the embodiment described above, in a case where the seal member 60 is seen along a direction parallel to both the diametrical direction of the space 11 and the diametrical direction of the seal member 60, the seal member 60 is provided in a state of being tilted relative to the axis center X of the space 11. However, in a case where the seal member 60 is seen along a direction parallel to both the diametrical direction of the space 11 and the diametrical direction of the seal member 60, the seal member 60 can also be provided in a state of being parallel to the axis center X of the space 11.

Figure 7:
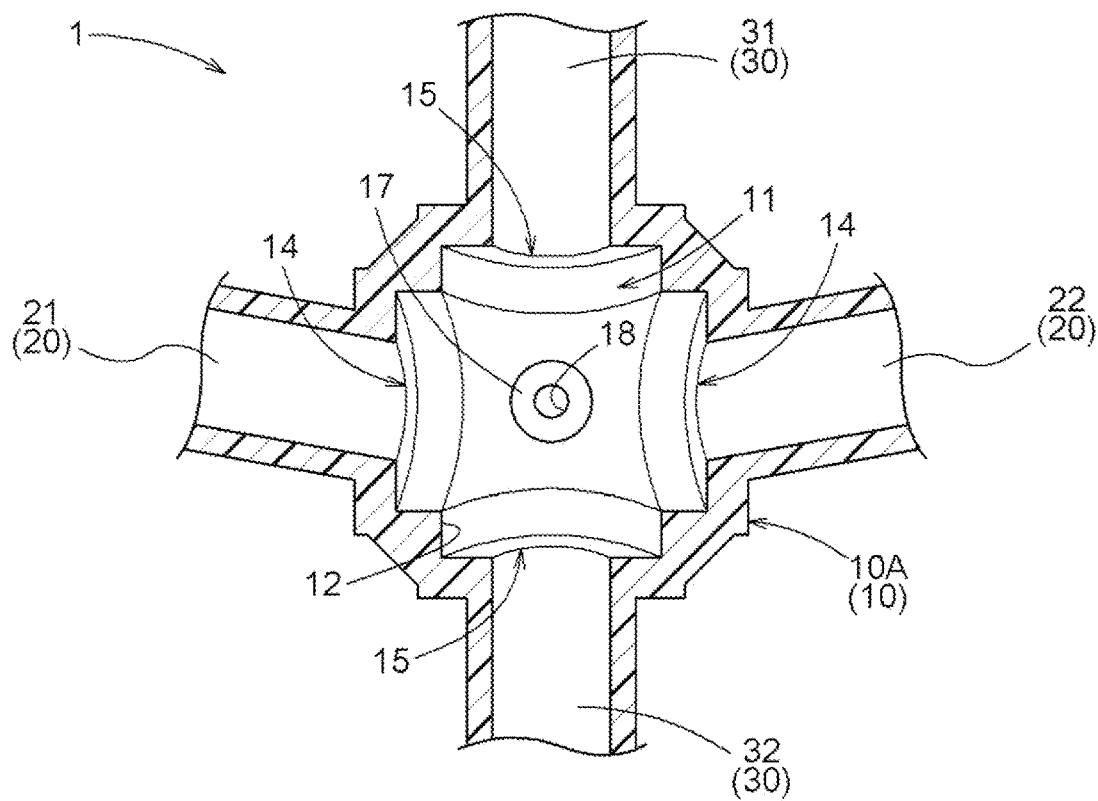
FIG. 7 is a view illustrating an example in which a port position is changed.

In the embodiment described above, FIG. 2 illustrates that the first fluid introduction path 21, the second fluid introduction path 22, the first fluid discharge path 31, and the second fluid discharge path 32 are provided at every 90 degrees in a plan view. For example, two of the first fluid introduction path 21, the second fluid introduction path 22, the first fluid discharge path 31, and the second fluid discharge path 32 facing each other can also be configured so as not to be disposed in alignment on a straight line. In other words, for example, as illustrated in FIG. 7, in a plan view, an angle between the first fluid introduction path 21 and the first fluid discharge path 31, and an angle between the second fluid introduction path 22 and the first fluid discharge path 31 can also be configured to be acute angles, and an angle between the first fluid introduction path 21 and the second fluid discharge path 32, and an angle between the second fluid introduction path 22 and the second fluid discharge path 32 can also be configured to be obtuse angles. With such a configuration, the valve element 40 can be reduced in size. Therefore, slide torque can be reduced, and the valve device 1 can be reduced in size.

Figure 8:
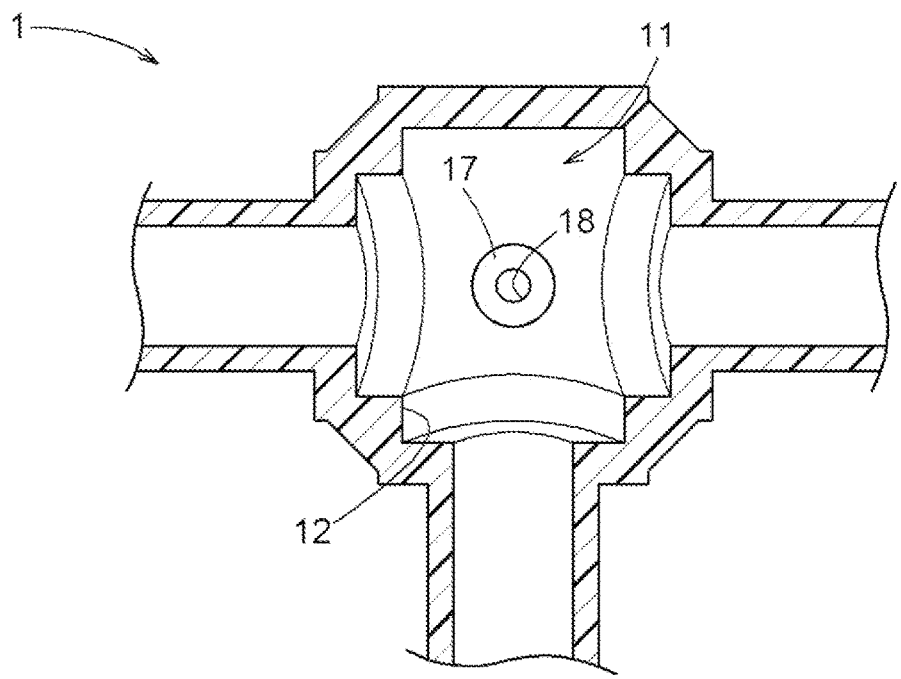
FIG. 8 is a view illustrating an example in which the number of ports is changed.
Figure 9:
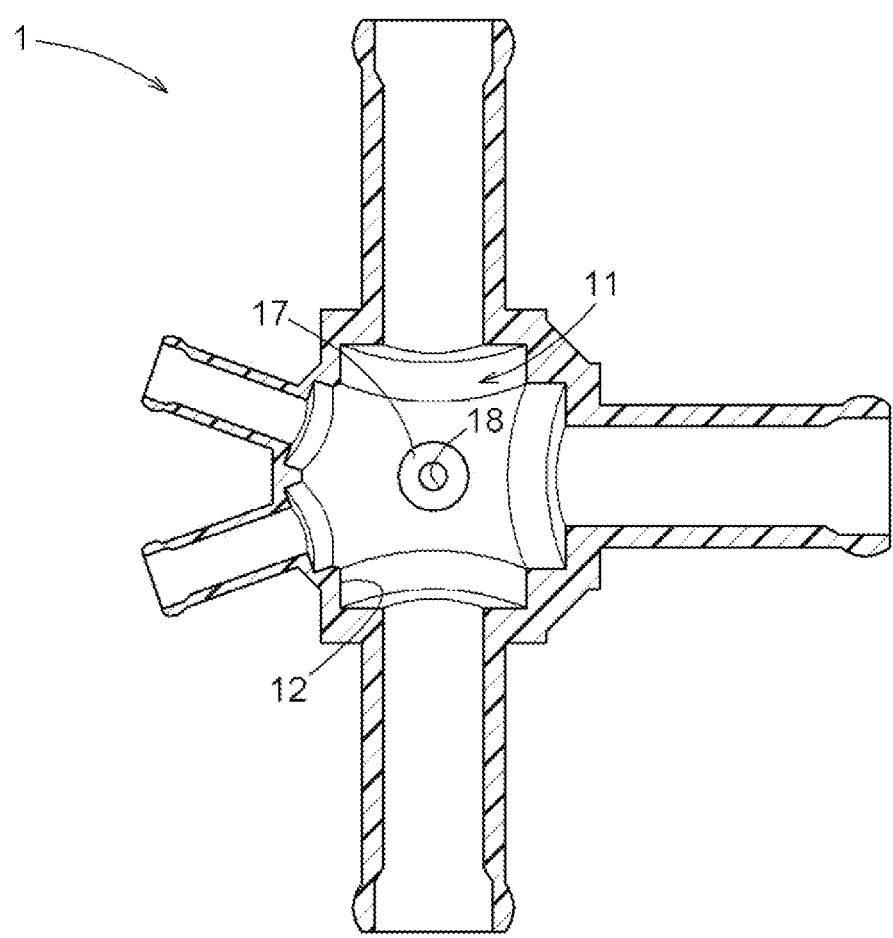
FIG. 9 is a view illustrating an example in which the number of ports is changed.

An example of a four-way valve in which the first fluid introduction path 21, the second fluid introduction path 22, the first fluid discharge path 31, and the second fluid discharge path 32 are provided in the housing 10 has been described in the embodiment described above. However, this disclosure is also applicable to a three-way valve as illustrated in FIG. 8 or a five-way valve as illustrated in FIG. 9.

While the two communication paths 45 of the valve element 40 have a similar flow path cross-sectional area in the embodiment described above, flow path cross-sectional areas of the two communication paths 45 may be configured to be different from each other. This enables pressure loss in the communication path 45 having an enlarged flow path cross-sectional area to be reduced. In other words, the communication path 45 on a side where smaller pressure loss is desired is preferably set to a larger flow path cross-sectional area.

This disclosure is usable for a valve device that is able to control circulation of fluid, and assembly of the valve device.

A valve device according to this disclosure includes a housing, a fluid introduction path, a fluid discharge path, a valve element, a valve element rotation mechanism, a seal member, and a shaft. The housing has a cylindrical internal peripheral wall in which a columnar space is formed. The fluid introduction path is formed in the housing and communicates with the space in the internal peripheral wall. The fluid discharge path is formed in the housing and communicates with the space in the internal peripheral wall. The valve element has therein a communication path that brings the fluid introduction path and the fluid discharge path into communication with each other, and has, when seen along an axis center of the space in a state of being stored in the space, a major radial portion formed with a predetermined first internal radius associated with an internal radius of the internal peripheral wall of the housing, a minor radial portion formed with a second internal radius smaller than the first internal radius, and an intermediate portion that has an internal radius equal to or less than the first internal radius and equal to or more than the second internal radius and that is formed in such a way as to join the major radial portion and the minor radial portion together. The valve element rotation mechanism has the axis center as a rotation axis center and rotates the valve element inside the space. The seal member is provided on the internal peripheral wall and is able to contact the valve element rotating inside the space. The shaft is inserted in the space through a through-hole formed in the housing in such a way that the axis center of the valve element being stored in the space in a state of being out of alignment with the rotation axis center is aligned with the rotation axis center in accordance with the seal member and an internal radius of the valve element.

With such a characteristic configuration, since the shaft is inserted after the valve element is stored in the space in a state where the axis center of the valve element is out of alignment with the rotation axis center, the seal member can be combined without being compressed (pressed) when the valve element is combined with the housing. Further, by combining the seal member with such a configuration, the housing and each of the fluid introduction and fluid discharge paths are not configured to be divided from each other, and an increase in the number of components for combining the seal member can therefore be prevented. This enables suppression of a cost increase.

In the valve device described above, the valve element may be provided with a valve-element-side through-hole coaxially with the axis center of the valve element on a side where the through-hole in a state where the valve element is stored in the space is formed, the valve-element-side through-hole including a guide portion gradually decreasing in internal diameter as the guide portion becomes apart from the through-hole and guiding entry of the shaft, a first internal diameter portion communicating with the guide portion and being formed with a predetermined first internal diameter, and a second internal diameter portion communicating with the first internal diameter portion and being formed with a second internal diameter smaller than the first internal diameter, the shaft may include a first external diameter portion formed with a first external diameter associated with the first internal diameter, and a second external diameter portion coupled to the first external diameter portion and formed with a second external diameter associated with the second internal diameter, and an axial length of the second external diameter portion may be configured to be greater than a sum of an axial length of the first internal diameter portion and an axial length of the second internal diameter portion.

Such a configuration enables positional misalignment of the axis center of the valve element and the rotation axis center of the shaft to fall within a predetermined range before the first external diameter portion enters the first internal diameter portion, and further enables the axis center of the valve element to be aligned with the rotation axis center along with entry of the shaft into the valve-element-side through-hole.

In the valve device described above, a range which an external edge portion of the minor radial portion and an external edge portion of the intermediate portion account for relative to an external edge portion of the valve element when the valve element is seen along the axis center of the valve element may be 180 degrees.

With such a configuration, slide resistance of the valve element can be reduced. The configuration also enables sealing performance to be improved at two points that face each other and that are at least boundary parts between the major radial portion and the intermediate portion.

In the valve device described above, a diameter reduction amount of the minor radial portion relative to the major radial portion may be, in a state where the axis center of the valve element is aligned with the rotation axis center by the shaft, equal to or more than a collapse amount of the seal member in a state where the major radial portion is in contact with the seal member.

Such a configuration enables the major radial portion to certainly press the seal member, whereas the minor radial portion does not press the seal member. Therefore, sealing performance of the major radial portion can be improved, and wear of the seal member of the minor radial portion can be suppressed.

In the valve device described above, the seal member may be provided in a state of being tilted relative to the axis center of the space when the seal member is seen along a direction parallel to both a diametrical direction of the space and a diametrical direction of the seal member.

With such a configuration, the seal member can be easily combined with the housing. Dimensional management (tolerance management) becomes easy, and a diameter reduction amount of the valve element can be smaller. Further, a surface (seal surface) which the seal member contacts in the housing and the seal member are tilted relative to the axis center of the space, thereby enabling the seal member to be combined without being compressed. Since the seal member is brought into a state of being caught between the internal peripheral wall of the housing and the valve element, rattling of the valve element can be prevented.

An assembly method of a valve device according to this disclosure includes a valve element mounting step, a seal member fitting step, a fastening and fixing step, and an insertion step. The valve element mounting step is mounting a valve element in a columnar space formed inside a base housing, the valve element including, in a plan view, a major radial portion formed with a predetermined first internal radius associated with an internal radius of an internal peripheral wall of the base housing, a minor radial portion formed with a second internal radius smaller than the first internal radius, and an intermediate portion that has an internal radius equal to or less than the first internal radius and equal to or more than the second internal radius and that is formed in such a way as to join the major radial portion and the minor radial portion together. The seal member fitting step is fitting a seal member between an internal peripheral wall of the space and the valve element in a state where an axis center of the space and an axis center of the valve element are not aligned with each other. The fastening and fixing step is fastening and fixing a lid housing that closes an opening part of the base housing, to the base housing by use of a fastening member. The insertion step is inserting a shaft into a valve-element-side through-hole provided along the axis center of the valve element in such a way that an axis center of the valve element and an axis center of the space are aligned with each other, while being guided by a guide portion that passes through a through-hole formed in the lid housing and that gradually decreases in internal diameter as the guide portion becomes apart from the through-hole provided on the through-hole side of the valve element.

Such a characteristic configuration enables the valve device described above to be easily assembled.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve device comprising:
a housing having a cylindrical internal peripheral wall in which a columnar space is formed;
a fluid introduction path being formed in the housing and communicating with the space in the internal peripheral wall;
a fluid discharge path being formed in the housing and communicating with the space in the internal peripheral wall;
a valve element having a communication path inside that brings the fluid introduction path and the fluid discharge path into communication with each other, and having, when seen along an axis center of the space in a state of being stored in the space, a major radial portion formed with a predetermined first internal radius associated with an internal radius of the internal peripheral wall of the housing, a minor radial portion formed with a second internal radius smaller than the first internal radius, and an intermediate portion that has an internal radius equal to or less than the first internal radius and equal to or more than the second internal radius and that is formed in such a way as to join the major radial portion and the minor radial portion together;

a valve element rotation mechanism having the axis center as a rotation axis center and rotating the valve element inside the space;

a seal member being provided on the internal peripheral wall and being able to contact the valve element rotating inside the space; and a shaft inserted in the space through a through-hole formed in the housing in such a way that the axis center of the valve element stored in the space in a state of being out of alignment with the rotation axis center is aligned with the rotation axis center in accordance with the seal member and an internal radius of the valve element.

2. The valve device according to claim 1, wherein the valve element is provided with a valve-element-side through-hole coaxially with the axis center of the valve element on a side where the through-hole in a state where the valve element is stored in the space is formed, the valve-element-side through-hole including a guide portion gradually decreasing in internal diameter as the guide portion becomes apart from the through-hole and guiding entry of the shaft, a first internal diameter portion communicating with the guide portion and being formed with a predetermined first internal diameter, and a second internal diameter portion communicating with the first internal diameter portion and being formed with a second internal diameter smaller than the first internal diameter, the shaft includes a first external diameter portion formed with a first external diameter associated with the first internal diameter, and a second external diameter portion coupled to the first external diameter portion and formed with a second external diameter associated with the second internal diameter, and an axial length of the second external diameter portion is configured to be greater than a sum of an axial length of the first internal diameter portion and an axial length of the second internal diameter portion.

3. The valve device according to claim 1, wherein a range which an external edge portion of the minor radial portion and an external edge portion of the intermediate portion account for relative to an external edge portion of the valve element when the valve element is seen along the axis center of the valve element is 180 degrees.

4. The valve device according to claim 1, wherein a diameter reduction amount of the minor radial portion relative to the major radial portion is, in a state where the axis center of the valve element is aligned with the rotation axis center by the shaft, equal to or more than a collapse amount of the seal member in a state where the major radial portion is in contact with the seal member.

5. The valve device according to claim 1, wherein the seal member is provided in a state of being tilted relative to the axis center of the space when the seal member is seen along a direction parallel to both a diametrical direction of the space and a diametrical direction of the seal member.

6. An assembly method of a valve device, comprising:

a valve element mounting step of mounting a valve element in a columnar space formed inside a base housing, the valve element including, in a plan view, a major radial portion formed with a predetermined first internal radius associated with an internal radius of an internal peripheral wall of the base housing, a minor radial portion formed with a second internal radius smaller than the first internal radius, and an intermediate portion that has an internal radius equal to or less than the first internal radius and equal to or more than the second internal radius and that is formed in such a way as to join the major radial portion and the minor radial portion together;

a seal member fitting step of fitting a seal member between an internal peripheral wall of the space and the valve element in a state where an axis center of the space and an axis center of the valve element are not aligned with each other;

a fastening and fixing step of fastening and fixing a lid housing that closes an opening part of the base housing, to the base housing, by use of a fastening member; and an insertion step of inserting a shaft into a valve-element-side through-hole provided along the axis center of the valve element in such a way that the axis center of the valve element and the axis center of the space are aligned with each other, while being guided by a guide portion that passes through a through-hole formed in the lid housing and that gradually decreases in internal diameter as the guide portion becomes apart from the through-hole provided on the through-hole side of the valve element.

* * * * *